(12) United States Patent
Maiocchi et al.

(10) Patent No.: US 7,049,781 B2
(45) Date of Patent: May 23, 2006

(54) METHOD FOR CONTROLLING A DC MOTOR AND RELATIVE OPEN-LOOP VOLTAGE MODE CONTROLLER

(75) Inventors: Giuseppe Maiocchi, Capiago Intimiano (IT); Roberto Oboe, Vicenza (IT); Federico Marcassa, Mogliano Veneto (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 99 days.

(21) Appl. No.: 10/918,658

(22) Filed: Aug. 12, 2004

(65) Prior Publication Data
US 2006/0034592 A1    Feb. 16, 2006

(51) Int. Cl.
*G05B 11/42* (2006.01)

(52) U.S. Cl. ...................... 318/609; 318/610

(58) Field of Classification Search ........ 318/602–615; 388/833
See application file for complete search history.

(56) References Cited

U.S. PATENT DOCUMENTS 3,699,989 A * 10/1972 O'Connor et al. ....... 137/487.5

* cited by examiner

*Primary Examiner*—Paul Ip
(74) *Attorney, Agent, or Firm*—Lisa K. Jorgenson; Allen, Dyer, Doppelt, Milbrath & Gilchrist, P.A.

(57) ABSTRACT

A method for controlling in an open-loop voltage mode a DC motor driven through a power amplifier includes generating a control voltage for the DC motor to be input to the power amplifier based upon a difference between an external command and a correction signal, and amplifying the control voltage for generating a replica of an output of the power amplifier. A model of the DC motor is defined based upon electrical parameters of the DC motor. The method further includes estimating current flowing in the DC motor based upon the replica of the output of the power amplifier and the model of the DC motor, and generating the correction signal proportional to the estimated current.

16 Claims, 6 Drawing Sheets

METHOD FOR CONTROLLING A DC MOTOR AND RELATIVE OPEN-LOOP VOLTAGE MODE CONTROLLER

FIELD OF THE INVENTION

The present invention relates to DC motors, and more particularly, to a method for controlling in an open-loop voltage mode a DC motor without sensing current flowing through the motor, and to a corresponding open-loop voltage mode controller.

BACKGROUND OF THE INVENTION

The read/write heads of a hard disk are positioned by DC motors, typically a voice coil motor (VCM), that should be precisely driven for correctly sensing the arm or equivalent holder of the transducers to read data stored along a disk track. Voice coil motors are largely used, and for this reason the ensuing description is referred to these motors, but what will be stated holds even for other kinds of DC motors for positioning read/write heads onto a data storage disk.

Commonly, voice coil motors are current controlled by a feedback loop such as that of FIG. 1, often called Current Minor Loop (CML). The attribute "Minor" means that the CML is an inner feedback loop for controlling the current absorbed by the motor. Conventionally, the main or outer feedback loop is the loop for actually controlling the position of the heads over the hard disk.

In the Current Minor Loop, the current absorbed by the motor is commonly monitored by a sensing resistor in series to at least one winding of the motor. The main drawback of this approach is that the value of the sensing resistors should be precisely determined for minimizing errors, and thus they are quite expensive. The voltage drop on the nodes of a sensing resistor should be provided to an integrated control circuit through dedicated pins. Because of the ever increasing integration level of electronic circuits, a larger number of pins implies larger packaging costs. Moreover, forming feedback loops for controlling in a current mode a motor is a non-negligible cost, especially for large scale productions.

To prevent using dedicated pins for a current sensing signal, a feedback loop and a corresponding controller and an open-loop voltage mode control, such as that depicted in FIG. 2, may be used. The external command U is provided to the controller which generates a respective control voltage of the power amplifier. The parameters of the controller are determined as a function of the parameters of the DC motor.

The admittance of the motor varies during the functioning because the motor heats, and thus its resistance R increases with temperature. As a consequence, the filter that generates the control voltage of the power amplifier may be not sufficiently accurate when the motor resistance differs from its nominal value.

Of course, it is possible to modify parameters that define the filter for adjusting them to resistance variations of the motor, but this can be done only after having determined the effective resistance R of the motor. This should be performed without sensing the current circulating in the motor for having the above mentioned advantages of the open-loop voltage mode control.

A problem that often occurs with this kind of driving mode is that the power amplifier may saturate. As long as the power amplifier is in its linear functioning mode, the voltage control mode has almost the same performances of a current control mode. When the power amplifier saturates, the control of the motor in a voltage mode differs from that in a current mode.

FIG. 3 compares the effects on the motor current of a step voltage that saturates the power amplifier controlled in a voltage mode. The current forced through the motor by the power stage controlled in a voltage mode (Zero Pole Cancellation) differs from the current that would be forced by a power amplifier controlled in a current mode because of the saturation of the power amplifier.

SUMMARY OF THE INVENTION

An object of the invention is to provide a method for controlling in a voltage mode a DC motor for preventing saturation of the power amplifier.

This and other objects of the invention are provided by estimating the current flowing through the motor by using a certain mathematical model of the motor, and exploiting this estimation of the current for correcting the control voltage input to the power amplifier. In so doing, the same performances of a current control mode are substantially obtained but without using any sensing resistance.

The method in accordance with the invention may be performed if parameters of the motor can be estimated for obtaining the mathematical model of the motor. This can be easily done by using any of the numerous methods for estimating the parameters of a DC motor.

More precisely, the method for controlling in an open-loop voltage mode a DC motor driven through a power amplifier comprises the steps of generating a control voltage of the DC motor to be input to the power amplifier as a function of the difference between an external command and a correction signal, amplifying the control voltage for generating a replica of the output of the power amplifier, and defining a model of the DC motor as a function of estimated or measured electrical parameters of the motor. The current flowing in the motor may be estimated as a function of the amplified replica and the model of the motor, and the correction signal may be generated proportional to the estimated current.

The method may be implemented in an open-loop voltage mode controller of a DC motor driven through a power amplifier comprising a filter generating a control voltage to be input to the power amplifier as a function of the difference between an external command and a correction signal, and a second amplifier generates a replica of the output of the first power amplifier. An estimation circuit for estimating the current flowing in the motor is a function of the replica and of a model of the DC motor, and generates the correction signal proportional to the estimated current.

BRIEF DESCRIPTION OF THE DRAWINGS

For a better understanding of the invention, reference is made to the following description of exemplary embodiments thereof, considered in conjunction with the accompanying drawings, wherein.

DETAILED DESCRIPTION OF THE PREFERRED EMBODIMENTS

Figure 4:
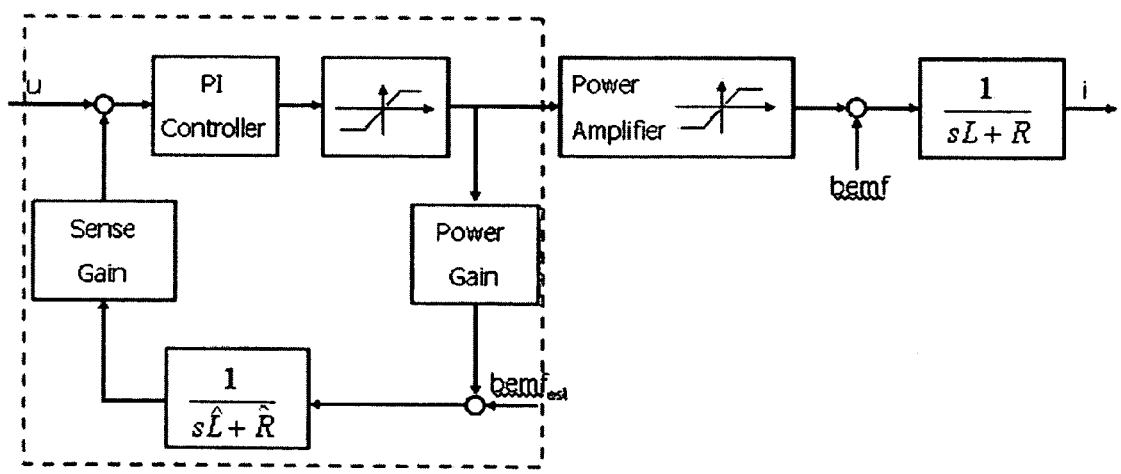
FIG. 4 is a block diagram for comparing the current flowing in the motor following a large step command according to the scheme of FIG. 2, the scheme of FIG. 1 and the scheme of the invention.

The current flowing in the VCM after the transient is related to the integral of the applied voltage, thus, as it can be observed from FIG. 4, the controller does not bring the current at the desired value when the voltage actually applied to the VCM is limited by the saturation. This would have been reached if an unsaturated control voltage were applied to the VCM. A new controller implementation, capable of taking into account the effects of saturation, and a novel method of controlling a motor, which is referred herein as Voice Coil Model-based Control (VCMC), will now be discussed.

Figure 1:
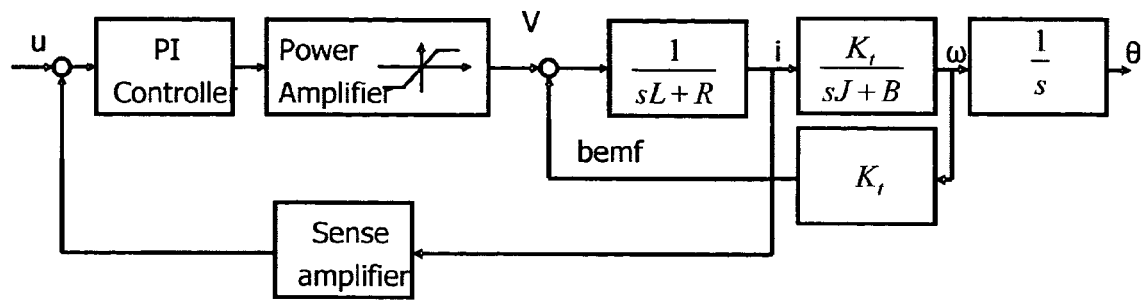
FIG. 1 is a block diagram of a Current Minor Loop for driving in current mode a VCM according to the prior art.
Figure 2:
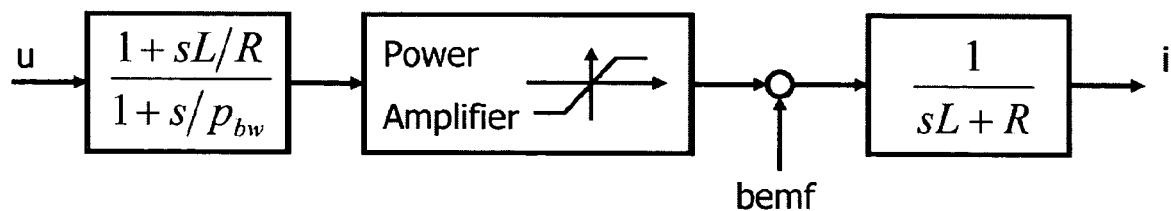
FIG. 2 is a block diagram of an open-loop voltage mode control of a VCM according to the prior art.
Figure 3:
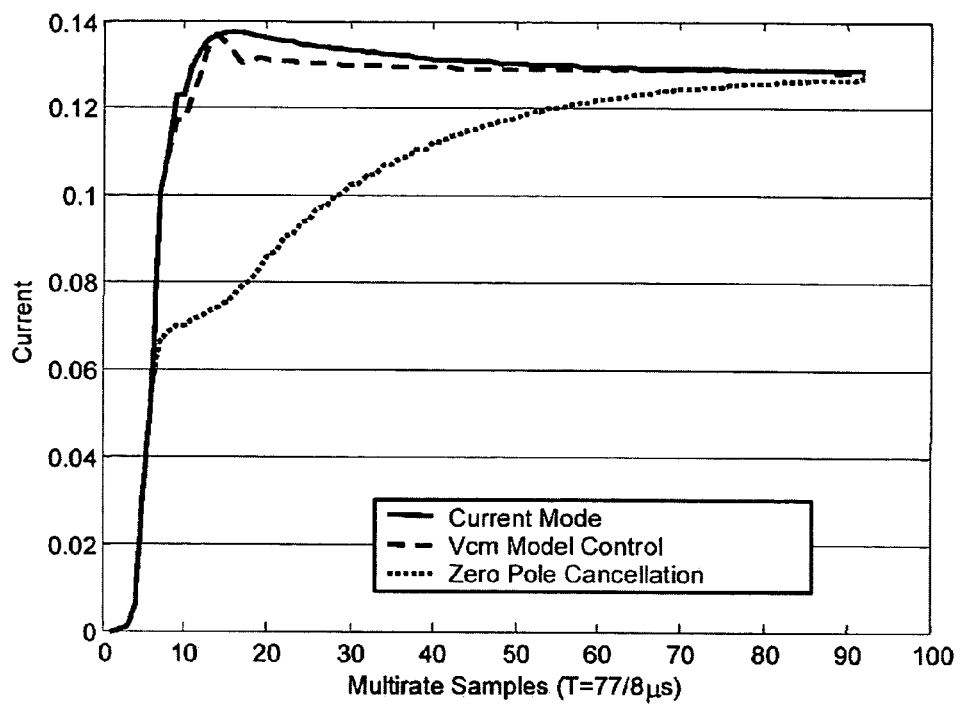
FIG. 3 is a graph illustrating the detail of the open-loop voltage mode controller according to the prior art.

It can be observed from the block diagram of FIG. 1 that the VCM is driven by the voltage V, while the current in the VCM depends on the difference between V and the back electromotive force (BEMF), proportional to the rotational speed $\omega$.

The VCMC substantially forms a fictitious current loop with a model of the VCM, as shown in FIG. 4. The saturated output of the proportional-integral (PI) controller can be used as a reference for a voltage amplifier that drives the real VCM. This forms a kind of current mirror, i.e., if the model of the VCM matches the actual one, the signal inputting the amplifier SENSE GAIN is identical to the current flowing in the VCM.

When the power amplifier is not saturated, the closed loop enclosed in the dashed box acts as a pre-filter that cancels out the electrical pole of the VCM, at least up to the bandwidth of the fictitious current loop. This can be easily understood by considering the PI controller in the frequency range where it has a high gain, so that the transfer function of the block bordered by the dashed line is close to the inverse of the transfer function of the feedback path, i.e., $s \cdot \hat{L} + \hat{R}$. When the power driver saturates, the system is simply driven by the saturated voltage minus the BEMF, as in standard current mode controllers.

It is worth noting that the current minor loop of FIG. 1 is always implemented in analog form, while a great advantage of using a voltage driver is that it is implemented in digital form. Moreover, the closed-loop bandwidth of the current minor loop is much higher than the sampling frequency of the servo-controller of the position of the read/write heads. Therefore, both the PI controller and the model of the VCM should be sampled with a high sampling rate to keep the performance of a digital voltage driver as close as possible to that of the current driver.

The digital voltage controller has been obtained by sampling the controller of FIG. 4 with a sampling rate which is preferably at least 10 times faster than the sampling frequency of the servo-controller.

Figure 5:
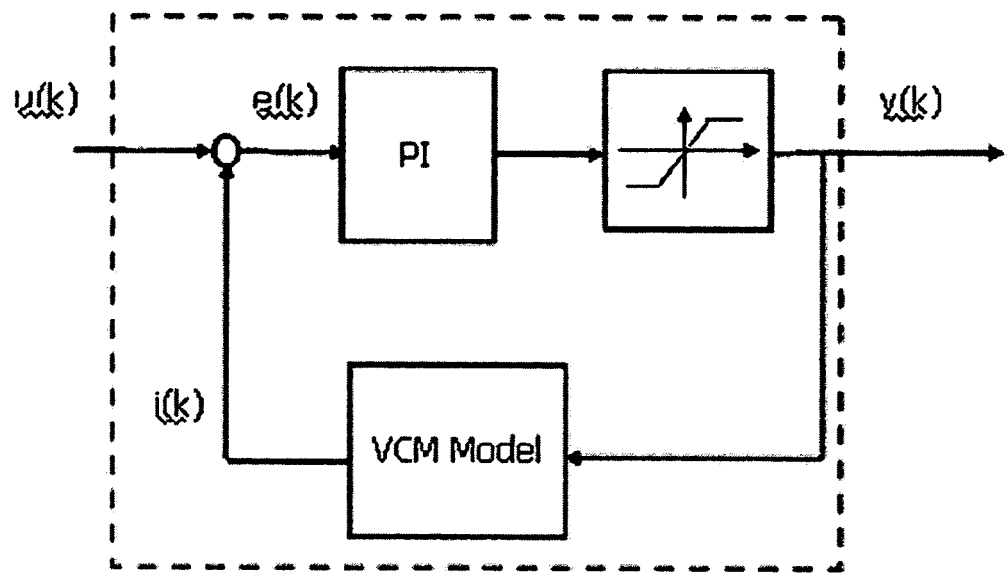
FIG. 5 is a block diagram of a basic model of the internal loop of the controller according to the invention.

The dashed block in FIG. 4 is equivalent to that in FIG. 5 where the PI controller, the VCM model block and saturation blocks are highlighted. Each of these blocks is sampled and the model of the controller is obtained by putting together the models of all the blocks.

Figure 6:
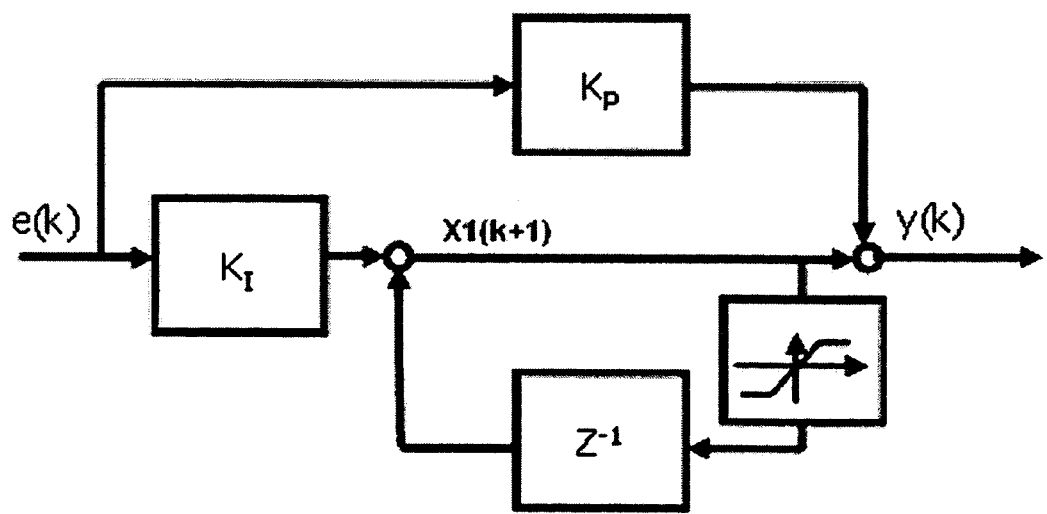
FIG. 6 is a block diagram of a discrete model of the blocks on the signal path of the loop of FIG. 5.

In FIG. 6 the block PI is described in detail and the first state variable $x_1(k)$ is shown. From FIG. 6:

$$x_1(k+1) = sat[x_1(k)] + K_I \cdot e(k) \tag{1}$$

$$y(k) = sat[x_1(k)] + (K_I + K_P) \cdot e(k) \tag{2a}$$

$$y(k) = sat[y(k-1) - K_P \cdot e(k-1)] + (K_I + K_P) \cdot e(k) \tag{2b}$$

The VCM model is $$i(s) = \frac{1}{s \cdot \hat{L} + \hat{R}} \cdot y(s) \tag{3}$$

wherein $\hat{R}$ and $\hat{L}$ are estimated values of the resistance and inductance of the motor. Equation (3), with the bilinear sampling:

$$s = \frac{2}{T} \cdot \frac{z-1}{z+1} \tag{4}$$

wherein T is the sampling period, results in $$i(z) = \frac{\frac{T}{\hat{R} \cdot T + 2 \cdot \hat{L}} \cdot (z+1)}{z + \frac{\hat{R} \cdot T - 2 \cdot \hat{L}}{\hat{R} \cdot T + 2 \cdot \hat{L}}} \cdot y(z) = \frac{b_0 \cdot (1 + z^{-1})}{1 - a_1 \cdot z^{-1}} \cdot y(z) \tag{5}$$

A state space model for the above equation is $$x_2(k+1) = a_1 \cdot x_2(k) + y(k) \tag{6a}$$

$$i(k) = (b_0 \cdot a_1 + b_0) \cdot x_2(k) + b_0 \cdot y(k) \tag{6b}$$

A state space discrete time model for the block within the dashed border in FIG. 4 is:

$$e(k) = \frac{-b_0}{1 + b_0 \cdot (K_I + K_P)} \cdot sat(x_1(k)) + \frac{-(b_0 \cdot a_1 + b_0)}{1 + b_0 \cdot (K_I + K_P)} \cdot x_2(k) + \frac{1}{1 + b_0 \cdot (K_I + K_P)} \cdot u(k) \tag{7a}$$

-continued $$\begin{bmatrix} x_1(k+1) \\ x_2(k+1) \end{bmatrix} = \begin{bmatrix} 1 - \frac{-b_0}{1+b_0 \cdot (K_I+K_P)} & \frac{-(b_0 \cdot a_1 + b_0) \cdot K_I}{1+b_0 \cdot (K_I+K_P)} \\ \frac{1}{1+b_0 \cdot (K_I+K_P)} & \frac{a_1 - b_0 \cdot (K_I+K_P)}{1+b_0 \cdot (K_I+K_P)} \end{bmatrix} \quad (7b)$$

$$\begin{bmatrix} sat(x_1(k)) \\ x_2(k) \end{bmatrix} + \begin{bmatrix} \frac{K_I}{1+b_0 \cdot (K_I+K_P)} \\ \frac{K_I + K_P}{1+b_0 \cdot (K_I+K_P)} \end{bmatrix} \cdot u(k)$$

$$y(k) = \begin{bmatrix} \frac{1}{1+b_0 \cdot (K_I+K_P)} & \frac{-(a_1+1) \cdot b_0 \cdot (K_I+K_P)}{1+b_0 \cdot (K_I+K_P)} \end{bmatrix} \quad (7c)$$

$$\begin{bmatrix} sat(x_1(k)) \\ x_2(k) \end{bmatrix} + \frac{K_I + K_P}{1+b_0 \cdot (K_I+K_P)} \cdot u(k)$$

By substituting this model written as a DSP algorithm, to the VCM current mode controller on a commercial driver, some experimental results have been taken and plotted in FIGS. 7a, 7b, 8a and 8b.

Figure 7A:
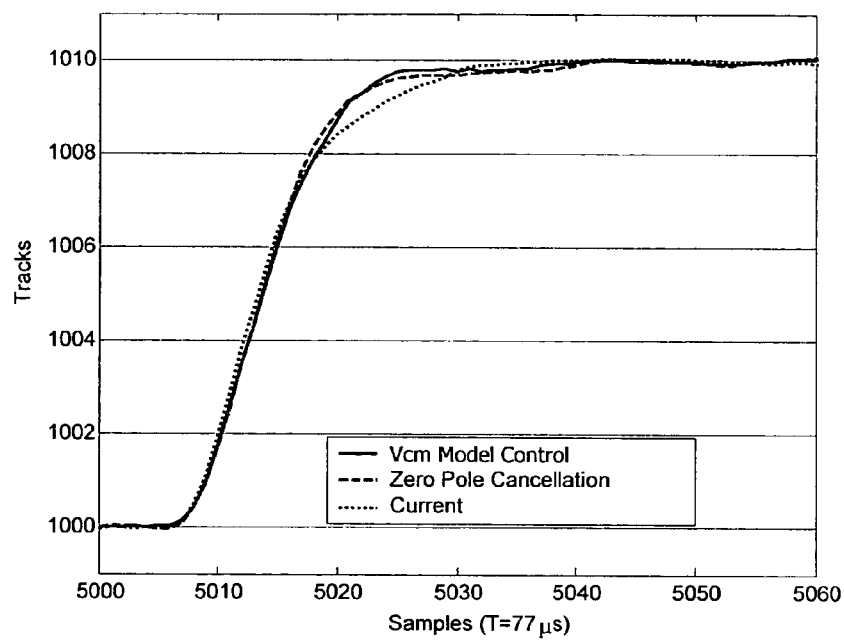
FIG. 7a is a graph comparing sample short seek responses of a VCM when controlled in a current mode, in a classic open-loop voltage mode and with the method according to the invention.

FIG. 7a depicts the trajectory of the VCM in performing an average short seek from track 1000 to track 1010 with the VCM controlled in a current mode, a voltage mode without saturation (zero pole cancellation), and according to the open-loop voltage mode control of the invention.

Figure 7B:
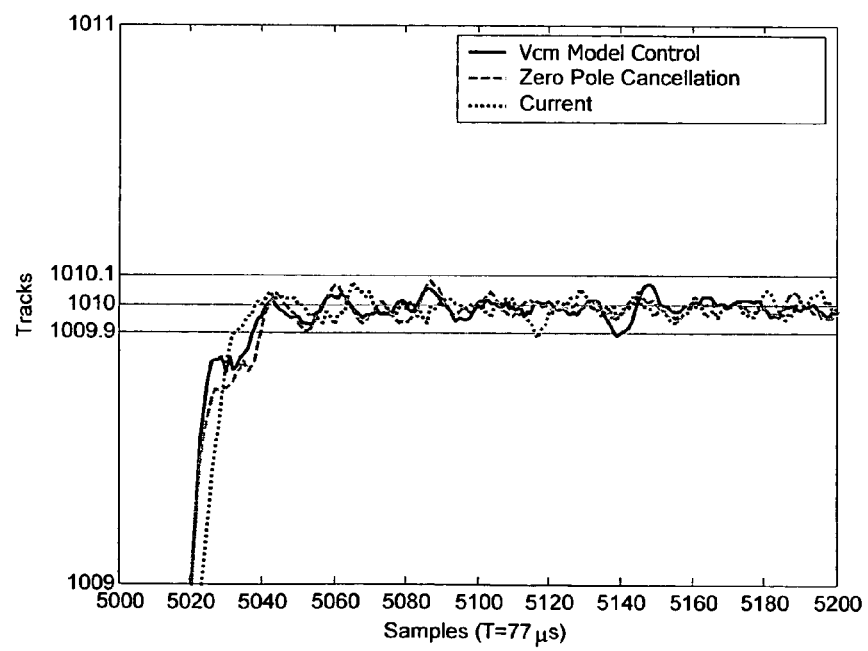
FIG. 7b is a graph comparing sample responses of a VCM arriving at a desired track after a short seek when controlled in a current mode, in a classic open-loop voltage mode and with the method according to the invention.

FIG. 7b shows the end portion of the trajectory and the ensuing tracking with the VCM controlled in a current mode, a voltage mode without saturation (zero pole cancellation), and according to the open-loop voltage mode control of the invention.

Figure 8A:
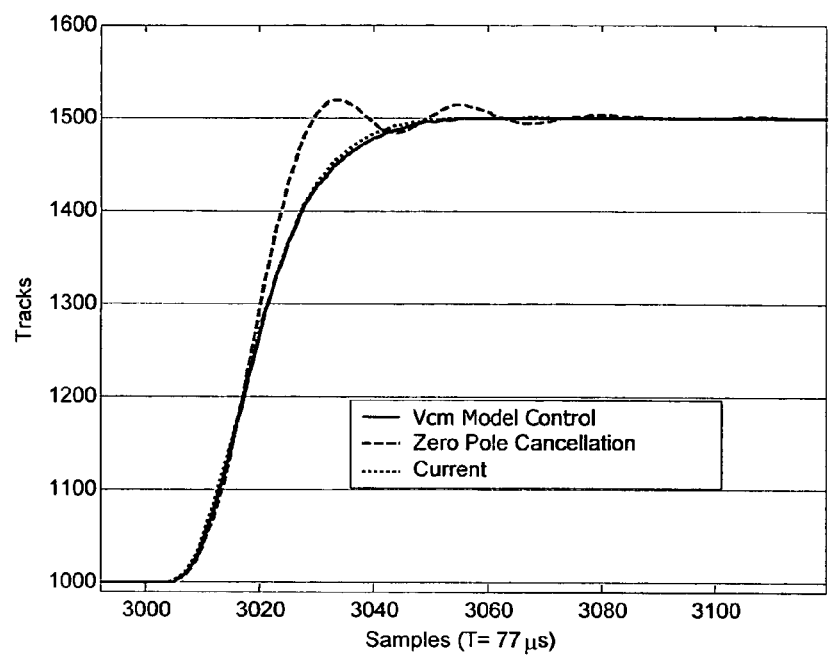
FIG. 8a is a graph comparing average seek responses of a VCM when controlled in a current mode, in a classic open-loop voltage mode and with the method according to the invention.

FIG. 8a depicts the trajectory of the VCM in performing an average short seek from track 1000 to track 1500 with the VCM controlled in a current mode, a voltage mode without saturation (zero pole cancellation), and according to the open-loop voltage mode control of the invention.

Figure 8B:
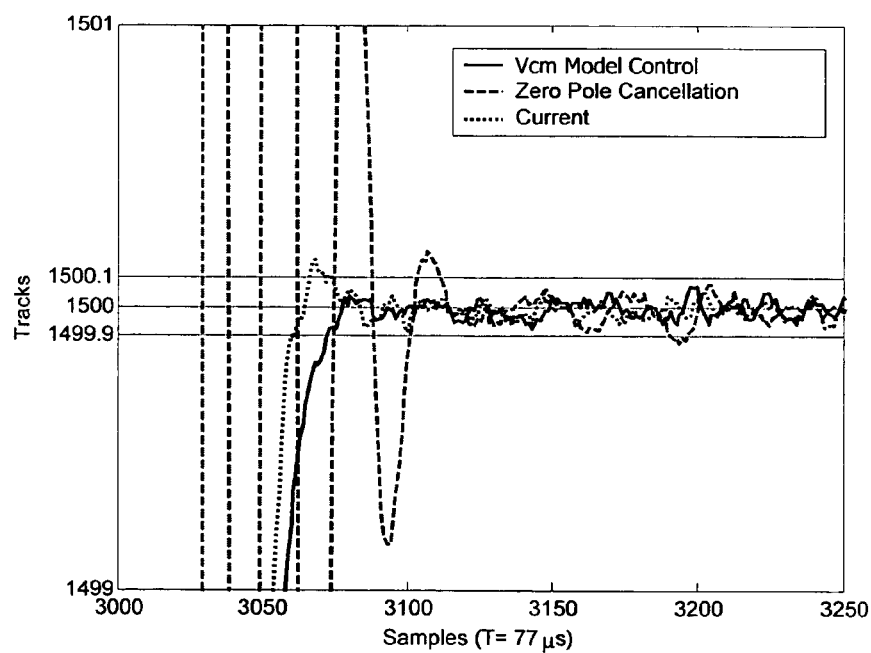
FIG. 8b is a graph comparing sample responses of a VCM for arriving to a desired track after an average seek when controlled in a current mode, in a classic open-loop voltage mode and with the method according to the invention.

FIG. 8b shows the end portion of the trajectory and the ensuing tracking with the VCM controlled in a current mode, a voltage mode without saturation (zero pole cancellation), and according to the open-loop voltage mode control of the invention.

Figure 9:
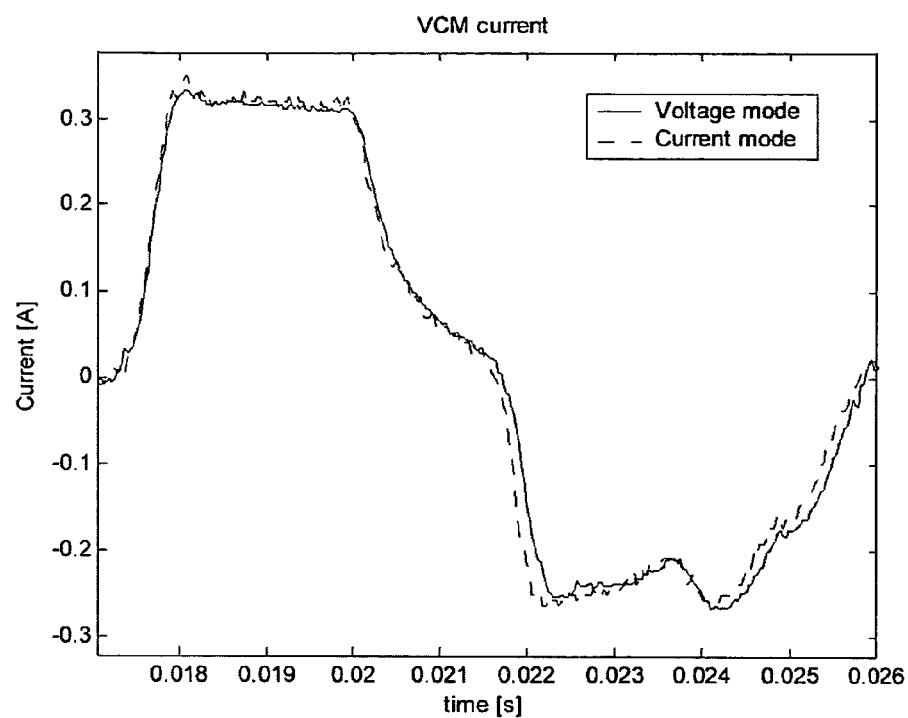
FIG. 9 is a graph comparing the current flowing in a VCM when a sample command is given to a current mode controller and a controller according to the invention.

Finally, a current profile obtained with the current controller of the invention when the disk is performing a seek with a 2000 h tracks span, is shown in FIG. 9 and compared with that obtained with the VCMC. Such experimental results, obtained on a commercial hard disk drive, confirm that the controller of the invention closely matches the performances of a standard current mode controller.

As stated above, the controller of this invention operates as a pre-filter that cancels out the dynamics of the electrical part of the VCM and accounts for saturations. Such a pre-filter works properly when the model of the electrical part of the VCM matches closely the actual system, and in this case, the VCM controlled by the controller of the invention operates as a VCM controlled in a current-mode.

Good performances are obtained even when the electrical time constant of the VCM is over estimated, provided that the motor gain is known with a certain accuracy. In such a case, the transfer function between the external command U and the actual current results to a phase lead, compared to any current mode controller, and does not lead toward instability when the entire servo-controller of the position of the heads are moved by the motor. Reference is directed to the following two articles: Oboe et al., Realization Of A Hard Disk Drive Head Servo-Positioning System With A Voltage-Driven Voice-Coil Motor, Microsystem Technologies, Vol. 9, No. 4, 2003, pp. 271–281; and Oboe et al., Realization Of An Adaptive Voltage Driver For Voice Coil Motor, ISPS-MIPE Joint Conference, June 2003, Yokohama, Japan. It is also worth noting that such a phase lead occurs in a frequency range that is usually higher than the bandwidth of the servo-controller, so there is a negligible effect on its performances.

When there is a difference between actual and nominal VCM resistance (the latter used in the model of the VCM), the transfer function between the current reference and the VCM position (when considered in the low-frequency range) is:

$$\frac{\Theta(s)}{I_{ref}(s)} = \frac{\hat{R}}{R} \cdot \frac{K_t}{J \cdot s^2} \quad (8)$$

wherein $\Theta(s)$ is the Laplace transform of the function of the angular position of the motor, J is the moment of inertia of the rotor and $K_t$ is the gain of the motor. This means that the open-loop crossing frequency of the servo-controlled motor changes accordingly, with significant consequences on the stability of the loop of the servo-controller.

Figure 10:
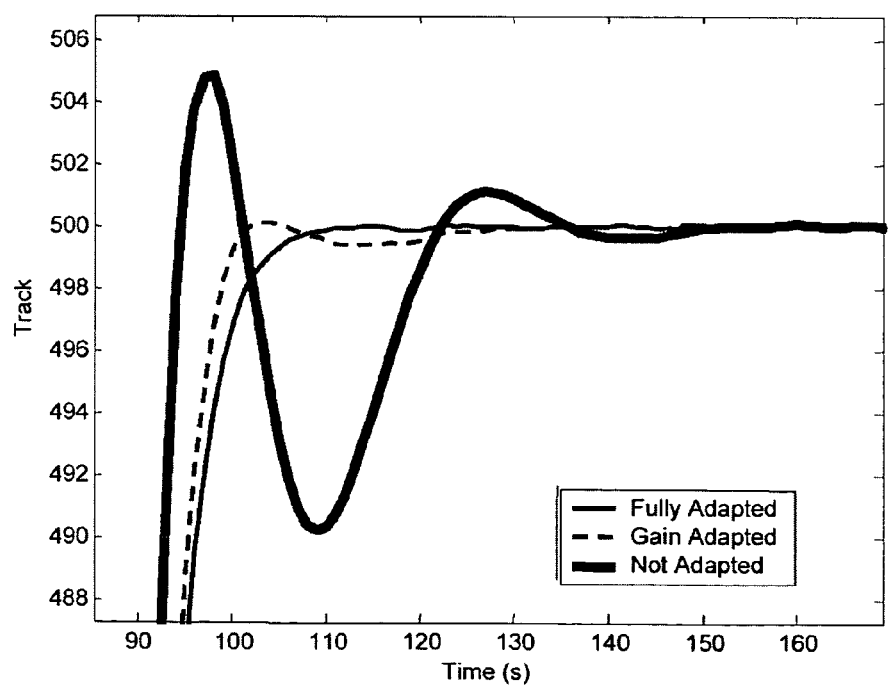
FIG. 10 is a graph comparing with an ideal response experimental responses of a VCM controlled with the controller of the invention when the gain of the controller is not adapted and is adapted to the low-frequency gain of the controlled motor.

This is shown in FIG. 10, reporting the experimental responses to a seek operation at a track (500) of the pre-filter with different tunings, after the VCM resistance has been changed by +20%. This results in a variation of the gain of the motor. The thin continuous line is obtained with the controller re-tuned on the actual VCM resistance and inductance. The dashed line is obtained with the controller in which only the value of the VCM resistance has been varied to match the actual value. The thick line shows the response when the controller is kept with the nominal values of the parameters of the motor.

The results confirm that the controller of the invention should be adapted against variations of VCM parameters, but also that such adaptation can be limited to the low-frequency gain, i.e., it is necessary to identify only the gain of the VCM, thus reducing the complexity of the identification procedure. This also confirms the analysis reported in the above referenced articles by Oboe et al. These two articles show that the performances of the servo-controller with the voltage controller of the invention is only slightly affected by uncertainties and variations of the electrical time constant (i.e., L/R).

Another issue of the on-line filter adaptation is the computational load that it brings along. This aspect could be particularly significant in the method of the invention, where the adaptation to variations should be done in both the model of the motor and of the PI controller to maintain the same degree of stability of the closed-loop system that replicates the current loop.

Given the above considerations, a simpler approach to adaptation in terms of related computations comprises re-tuning only the gain between the input and output of the controller of the invention, according to the estimated variation of the gain of the motor, due to variations of VCM resistance. This preserves the stability of the VCMC internal loop and limits eventual variations of the crossing frequency of the servo-controller, and in turn, keeps the performances of the servo-controller close to the nominal level, even in case of large variations of VCM resistance.

That which is claimed is:

1. A method for controlling in an open-loop voltage mode a DC motor driven through a power amplifier, the method comprising:

generating a control voltage for the DC motor to be input to the power amplifier based upon a difference between an external command and a correction signal;

amplifying the control voltage for generating a replica of an output of the power amplifier;

estimating current flowing in the DC motor based upon the replica of the output of the power amplifier and a model of the DC motor; and generating the correction signal proportional to the estimated current.

2. A method according to claim 1, wherein generating the correction signal comprises:

monitoring a speed of the DC motor;

estimating a back electromotive force induced in a winding of the DC motor based upon the monitored speed;

calculating a sum of the replica of the output of the power amplifier and the estimated back electromotive force; and wherein the estimated current is based upon the sum of the replica of the output of the power amplifier and the estimated back electromotive force.

3. A method according to claim 2, wherein estimating the back electromotive force comprises multiplying the monitored speed by a certain value initially equal to a nominal torque constant of the DC motor; and further comprising:

estimating an effective resistance of the DC motor; and updating the certain value by increasing its value proportionally to resistance increments with respect to a nominal resistance of the DC motor.

4. A method according to claim 1, wherein the DC model is defined by a state space model in a discrete time domain.

5. A method for controlling a DC motor in an open-loop voltage mode, the method comprising:

generating a control voltage to be input to a power amplifier connected to an input of the DC motor, the control voltage being based upon a difference between an external command and a correction signal;

amplifying the control voltage for generating a replica of an output of the power amplifier;

estimating current flowing in the DC motor based upon the replica of the output of the power amplifier and a model of the DC motor; and generating the correction signal proportional to the estimated current, the generating comprising monitoring a speed of the DC motor, estimating a back electromotive force induced in a winding of the DC motor based upon the monitored speed, and calculating a sum of the replica of the output of the power amplifier and the estimated back electromotive force.

6. A method according to claim 5, wherein estimating the current flowing in the DC motor is based upon the sum of the replica of the output of the power amplifier and the estimated back electromotive force.

7. A method according to claim 5, wherein estimating the back electromotive force comprises multiplying the monitored speed by a certain value initially equal to a nominal torque constant of the DC motor; and further comprising:

estimating an effective resistance of the DC motor; and updating the certain value by increasing its value proportionally to resistance increments with respect to a nominal resistance of the DC motor.

8. A method according to claim 5, wherein the DC model is defined by a state space model in a discrete time domain.

9. An open-loop voltage mode controller for a DC motor driven through a power amplifier, the controller comprising:

a filter for generating a control voltage to be input to the power amplifier based upon a difference between an external command and a correction signal;

a second amplifier for generating a replica of an output of the power amplifier; and an estimation circuit for estimating current flowing in the DC motor based upon the replica of the output of the power amplifier and a model of the DC motor, and for generating the correction signal proportional to the estimated current.

10. A controller according to claim 9, wherein the DC motor comprises at least one winding, and a rotor associated with the at least one winding; and further comprising a correction circuit for generating a signal representing an estimated back electromotive force induced in the at least one winding of the DC motor based upon a speed of its rotor; and wherein the correction signal generated by said estimation circuit is also based upon the signal representing the estimated back electromotive force.

11. A controller according to claim 10, further comprising:

a feedback loop generating a feedback voltage representing an estimated value of the current circulating in the at least one winding of the DC motor based upon the control voltage and the estimated back electromotive force; and a proportional-integral controller receiving as input a difference between the external command and the feedback voltage, and outputting the control voltage to said filter.

12. A controller according to claim 11, wherein the DC motor has a resistance and an inductance associated therewith; said feedback loop comprising:

an adder receiving as input the replica of an output of the power amplifier signal output by said second power amplifier and the signal representing the estimated back electromotive force; and an R-L circuit having an estimated resistance and inductance based upon the resistance and inductance of the DC motor, said R-L circuit for generating the feedback voltage.

13. A DC motor assembly comprising:

a DC motor;

a power amplifier connected to an input of said DC motor; and an open-loop voltage mode controller connected to said power amplifier, said controller comprising a filter for generating a control voltage to be input to the power amplifier based upon a difference between an external command and a correction signal, a second amplifier for generating a replica of an output of the power amplifier, and an estimation circuit for estimating current flowing in the DC motor based upon the replica of the output of the power amplifier and a model of the DC motor, and for generating the correction signal proportional to the estimated current.

14. A DC motor assembly according to claim 13, wherein said DC motor comprises at least one winding, and a rotor associated with said at least one winding; and wherein said controller further comprises a correction circuit for generating a signal representing an estimated back electromotive force induced in said at least one winding of the DC motor based upon a speed of said rotor; and wherein the correction signal generated by said estimation circuit is also based upon the signal representing the estimated back electromotive force.

15. A DC motor assembly according to claim 14, wherein said controller further comprises:
- a feedback loop generating a feedback voltage representing an estimated value of the current circulating in said at least one winding of the DC motor based upon the control voltage and the estimated back electromotive force; and
- a proportional-integral controller receiving as input a difference between the external command and the feedback voltage, and outputting the control voltage to said filter.

16. A DC motor assembly according to claim 15, wherein said DC motor has a resistance and an inductance associated therewith; said feedback loop comprising:
- an adder receiving as input the replica of an output of the power amplifier signal output by said second power amplifier and the signal representing the estimated back electromotive force; and
- an R-L circuit having an estimated resistance and inductance based upon the resistance and inductance of the DC motor, said R-L circuit for generating the feedback voltage.

* * * * *